(12) United States Patent
Grossinger et al.

(10) Patent No.: US 9,927,881 B2
(45) Date of Patent: *Mar. 27, 2018

(54) HAND TRACKER FOR DEVICE WITH DISPLAY

(71) Applicant: Facebook, Inc., Menlo Park, CA (US)

(72) Inventors: Nadav Grossinger, Foster City, CA (US); Israel Grossinger, Karmei Yosef (IL); Nitay Romano, Geva Binyamin (IL)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/427,916

(22) Filed: Feb. 8, 2017

(65) Prior Publication Data
US 2017/0147082 A1 May 25, 2017

Related U.S. Application Data

(63) Continuation of application No. 15/057,382, filed on Mar. 1, 2016, now Pat. No. 9,606,618, which is a (Continued)

(51) Int. Cl.
*G09G 5/00* (2006.01)
*G06F 3/01* (2006.01)
(Continued)

(52) U.S. Cl.
CPC ......... *G06F 3/017* (2013.01); *G06K 9/00355* (2013.01); *G06K 9/00718* (2013.01);
(Continued)

(58) Field of Classification Search
CPC .... G06F 3/0304; G06F 3/0325; G06F 3/0421; G06F 3/0425; G06F 3/0428
(Continued)

(56) References Cited

U.S. PATENT DOCUMENTS 5,335,288 A 8/1994 Faulkner
5,638,220 A 6/1997 Ohtomo et al.
(Continued)

FOREIGN PATENT DOCUMENTS

CN 1122010 A 5/1996
JP 2000-267800 A 9/2000
(Continued)

OTHER PUBLICATIONS

Chinese First Office Action, Chinese Application No. 201080052855.9, dated Jul. 2, 2014, 15 pages.
(Continued)

*Primary Examiner* — Alexander Eisen
*Assistant Examiner* — Nelson Lam
(74) *Attorney, Agent, or Firm* — Fenwick & West LLP

(57) ABSTRACT

An apparatus for remote hand control of a computer device, the apparatus comprising: a hand tracker, configured to track movement of a hand of a user of the computer device, an image presenter, associated with the hand tracker, configured to present a first image representative of the hand and a second image to the user, and to move the first image in concert with the tracked movement, and a computer controller, associated with the image presenter and configured to control the computer device in accordance with an interaction between the first image and the second image, thereby allowing the user to control the computer device, by moving the hand for bringing the first image and the second image into the interaction.

20 Claims, 9 Drawing Sheets

Related U.S. Application Data continuation of application No. 13/497,589, filed as application No. PCT/IB2010/054228 on Sep. 19, 2010, now Pat. No. 9,507,411.

(60) Provisional application No. 61/244,473, filed on Sep. 22, 2009.

(51) Int. Cl.
| | | |
|---|---|---|
| *G06K 9/00* | (2006.01) | |
| *G06K 9/46* | (2006.01) | |
| *G06T 7/246* | (2017.01) | |
| *G06T 7/521* | (2017.01) | |
| *G06T 7/55* | (2017.01) | |
| *G06F 3/0484* | (2013.01) | |
| *G06F 3/0488* | (2013.01) | |

(52) U.S. Cl.
CPC ............ *G06K 9/4604* (2013.01); *G06T 7/248* (2017.01); *G06T 7/521* (2017.01); *G06T 7/55* (2017.01); *G06F 3/04845* (2013.01); *G06F 3/04883* (2013.01); *G06T 2207/10016* (2013.01); *G06T 2207/10028* (2013.01); *G06T 2207/30196* (2013.01)

(58) Field of Classification Search
USPC .......... 345/156–166, 173–179; 382/106–107
See application file for complete search history.

(56) References Cited

U.S. PATENT DOCUMENTS

| | | | |
|---|---|---|---|
| 6,549,288 | B1 | 4/2003 | Migdal et al. |
| 6,674,893 | B1 | 1/2004 | Abe et al. |
| 6,714,234 | B1 | 3/2004 | Hillis et al. |
| 7,176,440 | B2 | 2/2007 | Cofer et al. |
| 7,440,590 | B1 | 10/2008 | Hassebrook et al. |
| 8,264,536 | B2 | 9/2012 | McEldowney |
| 8,766,952 | B2 | 7/2014 | Lee et al. |
| 8,887,043 | B1 | 11/2014 | Pollack et al. |
| 9,201,499 | B1 * | 12/2015 | Chang ..................... G06F 3/011 |
| 9,507,411 | B2 | 11/2016 | Grossinger et al. |
| 9,523,771 | B2 * | 12/2016 | Romano .................. G01S 7/48 |
| 9,552,074 | B2 | 1/2017 | Grossinger et al. |
| 9,606,618 | B2 * | 3/2017 | Grossinger ............. G06F 3/017 |
| 9,648,698 | B2 * | 5/2017 | Raz ..................... H05B 37/0209 |
| 9,659,413 | B2 * | 5/2017 | Grossinger ............. G06F 3/011 |
| 9,749,513 | B2 * | 8/2017 | Grossinger .......... H04N 5/2256 |
| 9,842,407 | B2 * | 12/2017 | Raz ........................ G06T 7/521 |
| 9,858,703 | B2 * | 1/2018 | Kaminitz .............. G06T 15/005 |
| 9,870,068 | B2 * | 1/2018 | Romano ............... H04N 13/025 |
| 2002/0125435 | A1 | 9/2002 | Cofer et al. |
| 2002/0181742 | A1 | 12/2002 | Wallace et al. |
| 2003/0218761 | A1 | 11/2003 | Tomasi et al. |
| 2004/0108990 | A1 | 6/2004 | Lieberman et al. |
| 2005/0219552 | A1 | 10/2005 | Ackerman et al. |
| 2007/0120834 | A1 | 5/2007 | Boillot |
| 2008/0062123 | A1 | 3/2008 | Bell |
| 2008/0088588 | A1 | 4/2008 | Kitaura |
| 2008/0256494 | A1 | 10/2008 | Greenfield |
| 2008/0317332 | A1 | 12/2008 | Ivanov et al. |
| 2009/0002342 | A1 | 1/2009 | Terada et al. |
| 2009/0016572 | A1 | 1/2009 | Hassebrook et al. |
| 2009/0027337 | A1 | 1/2009 | Hildreth |
| 2009/0167682 | A1 | 7/2009 | Yamashita et al. |
| 2009/0189858 | A1 | 7/2009 | Lev et al. |
| 2009/0195659 | A1 | 8/2009 | Nagata et al. |
| 2009/0322673 | A1 | 12/2009 | Cherradi El Fadili |
| 2010/0189372 | A1 | 7/2010 | Chen et al. |
| 2011/0019056 | A1 | 1/2011 | Hirsch et al. |
| 2011/0211044 | A1 | 9/2011 | Shpunt et al. |
| 2011/0254810 | A1 | 10/2011 | Lee et al. |
| 2012/0056982 | A1 | 3/2012 | Katz et al. |
| 2012/0154607 | A1 | 6/2012 | Moed et al. |
| 2012/0162140 | A1 | 6/2012 | Lee et al. |
| 2012/0194561 | A1 * | 8/2012 | Grossinger ............. G06F 3/017 345/661 |
| 2012/0320092 | A1 | 12/2012 | Shin et al. |
| 2013/0044054 | A1 | 2/2013 | Lee et al. |
| 2013/0222427 | A1 | 8/2013 | Heo et al. |
| 2013/0265218 | A1 * | 10/2013 | Moscarillo ............. G06F 3/017 345/156 |
| 2013/0321585 | A1 | 12/2013 | Hassebrook et al. |
| 2013/0343634 | A1 * | 12/2013 | Xu ........................... G06K 9/36 382/154 |
| 2014/0002421 | A1 * | 1/2014 | Lee ..................... G06F 3/03545 345/179 |
| 2014/0055352 | A1 * | 2/2014 | Davis ..................... G06F 3/017 345/156 |
| 2014/0085192 | A1 * | 3/2014 | Posa ...................... G09G 3/001 345/156 |
| 2014/0334671 | A1 | 11/2014 | Lee et al. |
| 2015/0042680 | A1 | 2/2015 | Grossinger et al. |
| 2015/0310670 | A1 | 10/2015 | Grossinger |
| 2015/0317037 | A1 | 11/2015 | Suzuki |
| 2015/0338923 | A1 | 11/2015 | Grossinger et al. |
| 2016/0084960 | A1 * | 3/2016 | Harrison .................. G01C 3/00 356/4.03 |
| 2016/0098090 | A1 * | 4/2016 | Klein ...................... G06F 3/011 345/156 |
| 2016/0103498 | A1 * | 4/2016 | Yamaguchi ............. G06F 3/017 345/156 |
| 2016/0179188 | A1 | 6/2016 | Grossinger et al. |
| 2016/0180574 | A1 * | 6/2016 | Kaminitz ................ G06T 11/60 345/633 |
| 2016/0196657 | A1 * | 7/2016 | Kantor ................... G06T 7/0057 382/154 |
| 2016/0253812 | A1 * | 9/2016 | Grossinger ............. G01B 11/14 356/614 |
| 2016/0253821 | A1 * | 9/2016 | Romano .................. G06F 3/017 382/103 |
| 2016/0274679 | A1 * | 9/2016 | Romano ............. H04N 13/025 |
| 2016/0286202 | A1 | 9/2016 | Romano et al. |
| 2016/0335773 | A1 * | 11/2016 | Romano ............... G06T 7/0057 |
| 2017/0234679 | A1 * | 8/2017 | Raz .................... G01B 11/2513 359/558 |

FOREIGN PATENT DOCUMENTS

| | | |
|---|---|---|
| JP | 2010-534895 A | 11/2010 |
| KR | 10-2009-0084767 A | 8/2009 |
| WO | WO 2008/087652 A2 | 7/2008 |
| WO | WO 2009/018161 A1 | 2/2009 |
| WO | WO 2011/036618 A2 | 3/2011 |

OTHER PUBLICATIONS

Chinese Second Office Action, Chinese Application No. 201080052855.9, dated Mar. 30, 2015, 9 pages.
Chinese Third Office Action, Chinese Application No. 201080052855.9, dated Dec. 2, 2015, 12 pages.
European Patent Office, Search Report and Opinion, European Patent Application No. 10818488.8, dated Jun. 30, 2015, eight pages.
International Search Report and the Written Opinion dated Jun. 16, 2011 From the International Searching Authority Re. Application No. PCT/182010/054228.
Japan Patent Office, Office Action, Japanese Patent Application No. 2012-530394, dated Jan. 15, 2016, six pages.
Korean Office Action (Notice of Preliminary Rejection), Korean Application No. 10-2012-7009974, dated May 12, 2016, 4 pages.
Korean Office Action, Korean Application No. 10-2012-7009974, dated May 12, 2016, 10 pages.
Notice of Reason for Rejection dated Mar. 7, 2014 From the Japanese Patent Office Re. Application No. 2012-530394 and Its Translation Into English.
PCT International Search Report and Written Opinion, PCT Application No. PCT/US2016/019377, dated Jul. 15, 2016, 13 pages.

(56) References Cited

OTHER PUBLICATIONS

State Intellectual Property Office of the People's Republic of China, Office Action, Chinese Patent Application No. Application No. 201080052855.9, dated Aug. 23, 2016, seven pages.
United States Advisory Action, U.S. Appl. No. 13/497,589, dated Dec. 26, 2013, 3 pages.
United States Office Action, U.S. Appl. No. 15/057,382, dated Jun. 17, 2016, 17 pages.
United States Office Action, U.S. Appl. No. 13/497,589, dated Apr. 23, 2013, 16 pages.
United States Office Action, U.S. Appl. No. 13/497,589, dated Mar. 25, 2015, 29 pages.
United States Office Action, U.S. Appl. No. 13/497,589, dated Sep. 11, 2013, 26 pages.
European Patent Office, Examination Report, European Application No. 10818488.8, dated Feb. 7, 2017, seven pages.
United States Office Action, U.S. Appl. No. 15/057,382, dated Nov. 4, 2016, 10 pages.
European Patent Office, Summons to attend oral proceedings pursuant to Rule 115(1) EPC, European Patent Application No. 10818488.8, dated Jul. 17, 2017, eight pages.
Japan Patent Office, Office Action, Japanese Patent Application No. 2016-085276, dated Jun. 23, 2017, five pages.
Korea Intellectual Property Office, Office Action, Korean Patent Application No. 10-2017-7005250, dated May 22, 2017, six pages [with summary in English].
State Intellectual Property Office of the People's Republic of China, Notification of Reexamination, Chinese Patent Application No. 2010800528559, dated Apr. 20, 2017, eight pages.
State Intellectual Property Office of the People's Republic of China, Notification of Reexamination, Chinese Patent Application No. 201080052855.9, dated Aug. 25, 2017, seventeen pages.

\* cited by examiner

HAND TRACKER FOR DEVICE WITH DISPLAY

CROSS REFERENCE TO RELATED APPLICATIONS

This application is a Continuation of U.S. patent application Ser. No. 15/057,382, filed Mar. 1, 2016, which is a Continuation of U.S. patent application Ser. No. 13/497,589, filed Mar. 22, 2012, now U.S. Pat. No. 9,507,411, issued Nov. 29, 2016, which is the National Stage of International Patent Application of PCT/IB2010/054228, filed Sep. 19, 2010, which claims the benefit of U.S. Provisional Patent Application Ser. No. 61/244,473, filed Sep. 22, 2009, each of which is hereby incorporated by reference in its entirety.

FIELD AND BACKGROUND OF THE INVENTION

The present invention relates to control of computer devices and, more particularly, but not exclusively to a system and method for remote control of computer devices.

Currently, there is a variety of methods used for remote control of computer devices.

Some of the currently used methods enable a computer user to control a computer device with a predefined gesture, using one or more body parts, such as the user's arms or legs.

With the currently used methods, there is defined a discrete set of gestures. Once a user's body part seems to align in a predefined position, a gesture is detected. Consequently, the computer device carries out a predefined function.

With current methods, each gesture, once detected, activates computer actions which are predefined for the specific gesture. The current methods typically include an initial set-up stage. In the set-up stage, there is defined a discrete set of gestures and computer functions for each specific gesture in the set.

The gesture may be detected through a variety of currently used methods.

For example, some of the current methods include regular image analysis from a digital video stream. The video images are analyzed to detect the dominant body part's location and position. If the body parts are aligned in a predefined position, the predefined function is carried out by the computer device.

With the regular image analysis methods, the detection of the body part is carried out by analysis of each pixel in the video image. The pixel is analyzed by a comparison made between the pixel's color values and values of other pixels in proximity to the pixel. That is to say that the regular image analysis methods depend on a significant difference in color between the body part and background objects.

Other currently used methods are based on a computationally heavy calculation of a three dimensional depth map.

A depth map is an image that holds in each pixel the distance to the part of the object located in front of a depth camera.

With the three dimensional depth map, extraction of the location of the user's hands may prove relatively easy, since the hands are typically located in front of the rest of the user's body. Consequently, parts of the three dimensional map that are located in a distance exceeding a certain distance, may be discarded.

The depth map may be calculated using a variety of methods. For example, in stereovision methods, two or more cameras are used to capture images of the user's body. Images of an object captured from the cameras are compared and analyzed, to produce three dimensional data of depth location of each point on the surface of the user's body, thus yielding the depth map.

In shape from shading methods, the user's body is lit from several directions.

The shades of the body are compared and analyzed, to generate three dimensional data of the location of each point on the surface of the user's body, thus yielding the depth map.

SUMMARY OF THE INVENTION

According to a first aspect of the present invention there is provided an apparatus for remote hand control of a computer device, the apparatus comprising: a hand tracker, configured to track movement of a hand of a user of the computer device, an image presenter, associated with the hand tracker, configured to present a first image representative of the hand and a second image to the user, and to move the first image in concert with the tracked movement, and a computer controller, associated with the image presenter and configured to control the computer device in accordance with an interaction between the first image and the second image, thereby allowing the user to control the computer device, by moving the hand for bringing the first image and the second image into the interaction.

According to a second aspect of the present invention there is provided a computer implemented method for remote hand control of a computer device, the method comprising steps the computer device is programmed to perform, the steps comprising: tracking movement of a hand of a user of the computer device, presenting a first image representative of the hand and a second image to the user, and moving the first image in concert with the tracked movement, and controlling the computer device in accordance with an interaction between the first image and the second image, thereby allowing the user to control the computer device, by moving the hand for bringing the first image and the second image into the interaction.

According to a third aspect of the present invention there is provided a computer readable medium storing computer executable instructions for performing steps of remote hand control of a computer device, the steps comprising: tracking movement of a hand of a user of the computer device, presenting a first image representative of the hand and a second image to the user, and moving the first image in concert with the tracked movement, and controlling the computer device in accordance with an interaction between the first image and the second image, thereby allowing the user to control the computer device, by moving the hand for bringing the first image and the second image into the interaction.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof.

For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. The description taken with the drawings making apparent to those skilled in the art how the several forms of the invention may be embodied in practice.

In the drawings.

DESCRIPTION OF THE PREFERRED EMBODIMENTS

Figure 1:
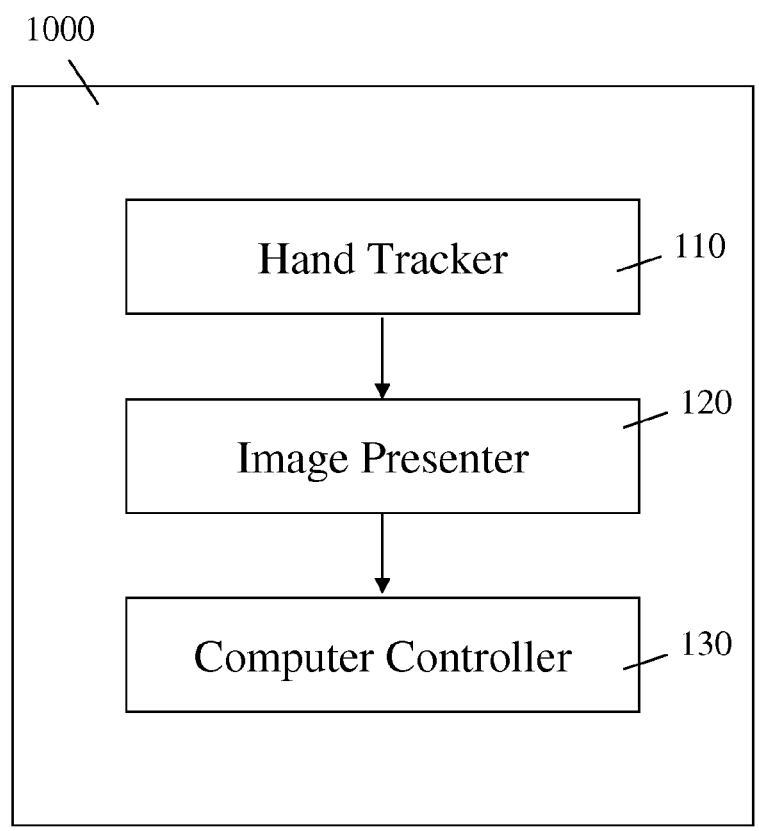
FIG. 1 is a block diagram schematically illustrating an apparatus for remote hand control of a computer device, according to an exemplary embodiment of the present invention.

The present embodiments comprise an apparatus and a method, for remote hand control of a computer device.

According to an exemplary embodiment of the present invention, movement of a hand of a user of a computer device is continuously tracked.

The user is presented a first image representative of the hand and a second image.

The first image may be a full and accurately animated image of the user's hand, presented on a screen. Alternatively, the first image rather consists of five cursors, which represent the locations of the hand fingertips. The first image may also have any other visual appearance which gives the user information about the location of digits (i.e. fingers, thumb, or both) in relation to the second image, as described in further detail hereinbelow.

As the user moves his hand (or only his fingers or thumb), the first image is moved in concert with the tracked movement. That is to say that the movement of the first image is correlated with the movement of the user's hand. If the user moves his hand to the left, the first image moves to the left. If the user flexes one of his fingers, the first image also flexes the finger (or moves the cursor representative of location of the finger's tip accordingly), etc.

Optionally, the second image is a graphical user interface (GUI) of a computer application such as a Microsoft™ Excel spreadsheet with buttons and menu options, a web page with hyperlinks, buttons, etc.

The computer device is controlled according to interaction between the first image and the second image, as if the first image is the user's own hand, and the second image is a GUI presented on a touch screen which allows the user to interact with the GUI's menu, buttons, etc., by touching the touch screen with his own fingers.

That is to say that the user is allowed to control the computer device, by moving the user's hand or fingers, for bringing the first image and the second image into the interaction.

Optionally, the second image is rather an image representative of a computer input device (say a computer keyboard, a computer mouse, a joystick, etc., as known in the art).

The computer device is controlled according to interaction between the first image and the second image, as if the hand in the image is the user's own hand, and the second image is a real computer input device connected to the computer device like any standard peripheral computer device (say a keyboard, a joystick, etc). The user is thus allowed to control the computer device, by moving the user's hand, for bringing the first image and the second image into the interaction.

Consequently, the remote control of the computer device, by movement of the user's hand, is a based on a continuous user interface, rather than on an interface limited to a predefined set of specific gestures (though specific gestures may also be defined).

In one example, if the user moves his hand, the first image moves over an image of a computer keyboard, and if the user moves his fingers in a typing movement, the computer device responds as if the user types using a real keyboard, as described in further detail hereinbelow.

The principles and operation of an apparatus and a method, according to exemplary embodiments of the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings.

The invention is capable of other embodiments or of being practiced or carried out in various ways. Also, it is to be understood that the phraseology and terminology employed herein is for the purpose of description and should not be regarded as limiting.

Reference is now made to FIG. 1, which is a block diagram schematically illustrating an apparatus for remote hand control of a computer device, according to an exemplary embodiment of the present invention.

Apparatus 1000 may be implemented on the computer device, be the computer device a desktop computer, a laptop computer, a cellular phone, etc. The apparatus 1000 may also be implemented on a device connectable to the computer device, say on a unit with a computer processor in communication with the computer device. Further, the apparatus 1000 may be implemented as software, as hardware, or as a combination of software and hardware.

The apparatus 1000 includes a hand tracker 110.

The hand tracker 110 tracks movement of a hand of a user of the computer device, say using images of the hand projected with light structured in a pattern useful for tracking fine movement of fingers and thumbs, as described in further detail hereinbelow.

Optionally, the hand tracker 110 is remote from the computer device, as described in further detail hereinbelow.

The apparatus 1000 further includes an image presenter 120, in communication with the hand tracker 110.

The image presenter 120 presents a first image representative of the hand and a second image.

Optionally, the second image is a graphical user interface (GUI) of a computer application such as a Microsoft™ Excel spreadsheet with buttons and menu options, a web page with hyperlinks, buttons, etc.

Optionally, the second image is rather representative of a computer input device say a computer mouse or a computer keyboard, as described in further detail hereinbelow.

Optionally, the second image is another graphical object, a picture, etc. The first image may be a full and accurately animated image of the user's hand, presented on the screen. Alternatively, the first image rather consists of five cursors, which represent the locations of the hand's fingertips. The first image may also have any other visual appearance which gives the user information about the location of digits (i.e. fingers, thumb, or both) in relation to the second image.

The image presenter 120 further moves the first image in concert with the user hand movement tracked by the hand tracker 110, as described in further detail hereinbelow.

Apparatus 1000 further includes a computer controller 130, in communication with the image presenter 120.

Optionally, the computer controller 130 is a part of a desktop computer, a laptop computer, etc., as described in further detail hereinbelow.

Optionally, the computer controller 130 is a part of a device installed in a car, as described in further detail hereinbelow.

Optionally, the computer controller 130 is a part of a cellular phone (say a smart phone), as described in further detail herein below.

The computer controller 130 controls the computer device in accordance with an interaction between the first image and the second image. Consequently, the computer controller 130 allows the user to control the computer device, by moving the hand for bringing the first image and the second image into the interaction, as described in further detail hereinbelow.

In one example, if the user moves his hand, the image presenter 120 moves the first image over an image of a computer keyboard. If the user moves his fingers in a typing movement, the computer controller 130 controls the computer device, making the computer device respond as if the user types using a real keyboard, as described in further detail hereinbelow.

In a second example, if the user moves his hand, the image presenter 120 moves the first image over an image of a computer mouse. If the user moves his fingers in a clicking movement, the fingers of the first image move in a clicking movement accurately correlated with the movement of the hand's movement. Consequently, the computer device responds as if the user clicks on one of the buttons of a real computer mouse, according to position of the first image in relation to the image of the computer mouse (i.e. with the fingers of the first image positioned over the button of the computer mouse in the image).

In a third example, the second image is a graphical user interface (GUI) of a computer application such as a Microsoft™ Excel spreadsheet with buttons and menu options, a web page with hyperlinks, buttons, etc.

The computer controller 130 controls the computer device according to interaction between the first image and the second image. The computer device is controlled, as if the first image is the user's own hand, and the second image is the GUI presented on a touch screen which allows the user to interact with the GUI's menu, buttons, etc., by touching the touch screen with his fingers.

Optionally, the hand tracker 110 uses bi-dimensional video data, for tracking the movement of the hand, say bi-dimensional video images streamed from a camera connected to the hand tracker 110, as described in further detail hereinbelow.

Optionally, the hand tracker 110 tracks the movement by detecting a segmentation (i.e. division) of a continuous feature in a light pattern projected onto the hand. The light pattern has the continuous feature in a first direction, and a noncontinuous (say periodic) feature in a direction substantially perpendicular to the first direction, as described in further detail hereinbelow.

In one example, the light pattern includes several stripes arranged in parallel (or in near parallel) to each other.

The hand tracker 110 may identify in the light pattern, one or more clusters of one or more stripe segments created by segmentation of stripes by a digit of the hand (i.e. a finger or a thumb), as described in further detail hereinbelow.

The hand tracker 110 tracks movement of the digit, by tracking the cluster of stripe segments created by segmentation of stripes by the digit, or by tracking at least one of the cluster's segments.

Optionally, the hand tracker 110 further identifies in the light pattern, one or more clusters of one or more stripe segments created by segmentation of stripes by a palm of the hand. The hand tracker 110 tracks movement of the hand, by tracking the cluster of stripe segments created by segmentation of stripes by the palm, or by tracking at least one of the cluster's segments.

Optionally, the hand tracker 110 may further detect a shift in position of a notation along a continuous feature in the light pattern projected onto the hand. The hand tracker 110 uses the detected shift, in the tracking of the hand, as described in further detail hereinbelow.

Optionally, the hand tracker 110 further identifies a depth movement of the digit (say a movement similar to clicking or a touch screen like operation), as described in further detail hereinbelow.

Optionally, after the clusters of stripe segments created by the hand's digits and palms are detected, only the stripe segments of the palm and digit clusters are tracked, thereby tracking the movement of the hands. Parts of video data excluding the stripe segment clusters, such as background stripe segments and additional image information may thus be dismissed.

Consequently, computational effort and processing time for tracking the movement may be significantly reduced.

Optionally, the apparatus 1000 further includes a light projector and a camera, in communication with the hand tracker 110, as described in further detail hereinbelow.

In one example, the light projector, the camera, or both, are remote from the computer device, as described in further detail hereinbelow.

Optionally, the light projector includes a source of light and a micro structured element, as known in the art.

The source of light may a laser diode, a light emitting diode (LED), any another element which emits a light beam, as known in the art.

The light beam emitted by the light source propagates through the micro structured element, onto the user's hand. The micro structured element modifies the light beam, for generating the light pattern projected onto the use's hand, as described in further detail hereinbelow.

Optionally, the micro structured element converts the light beam into a light beam of a variable cross sectional intensity profile. Consequently, the cross sectional intensity profile varies along the light beam, thus providing information indicative of a distance of an object (say one of the user's digits) from the source of light, as described in further detail hereinbelow.

Optionally, the light projector projects a light pattern having a continuous feature in a first direction and a non-continuous feature in a direction substantially perpendicular to the first direction, onto the hand, as described in further detail hereinbelow.

Optionally, the micro structured element is a diffractive optical element, as known in the art.

The diffractive optical element may be obtained by a periodic microstructure that splits the light beam into a discrete number of spots having a one dimensional or a two dimensional spatial arrangement, as know in the art.

Optionally, an additional element such as a cylindrical micro lens array or an additional diffractive element is used to create a stripe from each of the spots.

Optionally, the stripe is marked with phase notations positioned in fixed distances from each other, along the stripe, as described in further detail hereinbelow.

A possible advantage of using an additional microstructure element such as a cylindrical micro lens array is that the additional element may disperse a zero order of a light beam such as a laser beam, as known in the art.

The zero order is a center of a light spot output from the diffractive element, and may be characterized by relatively high energy. Dispersing the zero order to a light structure such as the stripe, may allow increasing intensity of a laser light beam without crossing eye safety limits.

Optionally, the light projector further includes an additional diffractive element, which changes the cross-sectional intensity profile of each stripe in the light pattern with respect to the distance from an object which reflects the projected stripe. The cross-sectional intensity profile is an intensity profile perpendicular to the propagation direction of the light projected.

Optionally, the intensity profile change is a gradual change from a Gaussian cross-sectional intensity profile to a Top Hat cross-sectional intensity profile, carried out gradually along a distance traversed by the projected light, as the projected light propagates to an object, and is reflected back from surface of the object.

Optionally, the intensity profile change is a gradual change from an intensity profile with a single peak to an intensity profile with two or more peaks, etc., as known in the art.

The change in the intensity profile, along distance traversed by light reflected from an object projected by the light with the light pattern, may help differentiate between stripes reflected from different objects, in different ranges, and thus further help overcome a segment unification problem, as discussed in further detail hereinbelow.

Further, the change in the intensity profile may further be used to directly measure distance to the object (say to the user's hand, fingers and thumb).

The camera may be a video camera such as a webcam or a cellular phone's camera, positioned next to the light projector.

The camera captures one or more image of the hand projected with the light pattern, and forwards the captured images to the hand tracker 110. The hand tracker 110 uses the captured images for tracking the movement of the hand, as described in further detail hereinbelow.

Optionally, the apparatus 1000 further includes a gesture recognizer, in communication with the hand tracker 110.

The gesture recognizer detects in the tracked movement of the hand, a gesture predefined by an administrator of the apparatus 1000. Upon the detection of the gesture, the computer controller 130 controls the computer device in a manner predefined for the detected gesture, as described in further detail hereinbelow.

Optionally, upon detection of a specific predefined gesture, the image presenter 120 aligns the first image into a predefined position. In one example, if the user shakes his hand, the image presenter 120 aligns the first image into a central position over the second image (say the computer keyboard image).

Optionally, upon detection of the specific predefined gesture, the image presenter 120 resizes the first image (i.e. hand image), as described in further detail hereinbelow.

Figure 2:
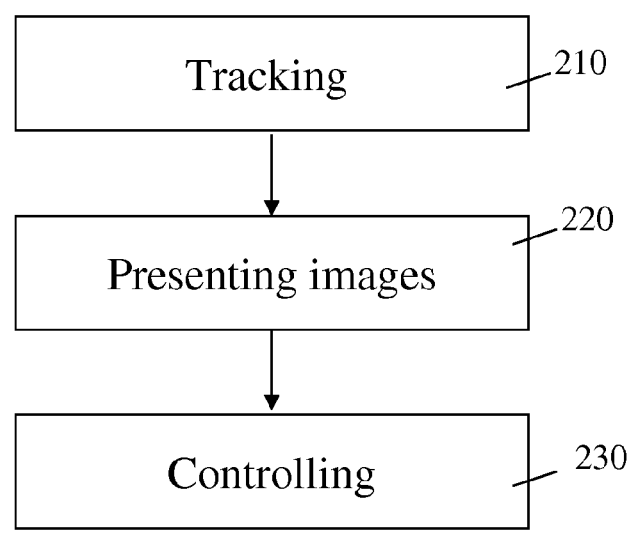
FIG. 2 is a flowchart illustrating a method for remote hand control of a computer device, according to an exemplary embodiment of the present invention.

Reference is now made to FIG. 2, which is a flowchart illustrating a method for remote hand control of a computer device, according to an exemplary embodiment of the present invention.

An exemplary method according to an exemplary embodiment of the present invention may be implemented on the computer device, be the computer device a desktop computer, a laptop computer, a cellular phone, etc.

The exemplary method may also be implemented on a device connectable to the computer device, say on a unit with a computer processor in communication with the computer device, as described in further detail hereinabove.

In the exemplary method, there is tracked 210 movement of a hand of a user of the computer device, say using images of the hand projected with light structured in a pattern useful for tracking fine movement of fingers and thumbs, as described in further detail hereinbelow. Optionally, the movement is tracked using the hand tracker 110, as described in further detail hereinabove.

Simultaneously, there are presented 220 a first image representative of the hand and a second image to the user, say on screen of the computer device. Optionally, the second image and the first image are presented to the user by the image presenter 120, as described in further detail hereinabove.

Optionally, the second image is a graphical user interface (GUI) of a computer application such as a Microsoft™ Excel spreadsheet with buttons and menu options, a web page with hyperlinks, buttons, etc.

Optionally, the second image is rather representative of a computer input device, say a keyboard or a computer mouse, as described in further detail hereinbelow.

Optionally, the second image is another graphical object, a picture, etc. The first image may be a full and accurately animated image of the user's hand, presented on the screen. Alternatively, the first image rather consists of five cursors, which represent the locations of the hand's fingertips. The first image may also have any other visual appearance which gives the user information about the location of digits (i.e. fingers and thumb) in relation to the second image.

The first image is moved in concert with the user hand movement tracked 210 by the hand tracker 110, as described in further detail hereinbelow.

The computer device is controlled 230, say by the computer controller 130, in accordance with an interaction between the first image and the second image.

Consequently, the user is allowed to control the computer device, by moving the hand for bringing the first image and the second image into the interaction, as described in further detail hereinbelow.

In one example, if the user moves his hand, the first image is moved over an image of a computer keyboard.

If the user moves his fingers in a typing movement, the computer device is controlled 230, to make the computer device respond as if the user types using a real keyboard wired to the computer device, as described in further detail hereinbelow.

In a second example, if the user moves his hand, the first image is moved over an image of a computer mouse.

If the user moves his fingers in a clicking movement, the fingers of the first image move in a clicking movement accurately correlated with the movement of the hand's movement. Consequently, the computer device responds as if the user clicks on a button of a real computer mouse, according to position of the first image in relation to the image of the computer mouse (i.e. with the fingers of the first image positioned over the button of the computer mouse in the second image).

In a third example, the second image is a graphical user interface (GUI) of a computer application such as a Microsoft™ Excel spreadsheet with buttons and menu options, a web page with hyperlinks, buttons, etc.

The computer device is controlled 230 (say by the computer controller 130), according to interaction between the images. The computer device is controlled 230, as if the first image is the user's own hand, and the second image is a GUI presented on a touch screen which allows the user to interact with the GUI's menu, buttons, etc., by touching the touch screen with his fingers.

Optionally, the tracking 210 of the movement of the hand is carried out using bi-dimensional video data (say bi-dimensional video images streamed from a camera connected to the hand tracker 110), as described in further detail hereinabove.

Optionally, the movement is tracked 210, by detecting a segmentation (i.e. division) of a continuous feature in a light pattern projected onto the hand. The light pattern has the continuous feature in a first direction, and a non-continuous (say periodic) feature in a direction substantially perpendicular to the first direction, as described in further detail hereinbelow.

In one example, the light pattern includes several stripes arranged in parallel (or in near parallel) to each other.

Optionally, there may be identified in the light pattern, one or more clusters of one or more stripe segments created by segmentation of stripes by a digit of the hand (i.e. a finger or a thumb), as described in further detail hereinbelow. Consequently, the movement of the digit is tracked 210, by tracking the cluster of stripe segments created by segmentation of stripes by the digit, or by tracking at least one of the cluster's segments.

Optionally, there is further identified a depth movement of the digit (say a movement similar to a clicking or a touch screen like operation), say by detecting a change in the number of segments in the tracked cluster, as described in further detail hereinbelow.

Optionally, there are further identified in the light pattern, one or more clusters of one or more stripe segments created by segmentation of stripes by a palm of the hand. Consequently, the movement of the hand is tracked 210, by tracking the cluster of stripe segments created by segmentation of stripes by the palm, or by tracking at least one of the cluster's segments.

Optionally, there is further detected a shift in position of a notation along a continuous feature in the light pattern projected onto the hand. The detected shift is used in the tracking 210 of the hand, say by the hand tracker 110, as described in further detail hereinbelow.

Optionally, the exemplary method further includes detecting a gesture predefined by an administrator of the apparatus 1000, in the tracked 210 movement of the hand. Upon the detection of the gesture, the computer device is controlled 230 in a manner predefined for the detected gesture (say by the computer controller 130), as described in further detail hereinbelow.

Optionally, upon detection of the predefined gesture, the first image is aligned into a predefined position. In one example, if the user shakes his hand, the image presenter 120 aligns the first image into a central position over the second image (say the computer keyboard image or the GUI).

Optionally, upon detection of the predefined gesture, the first image is resized (say by the image presenter 120), as described in further detail hereinbelow.

Figure 3:
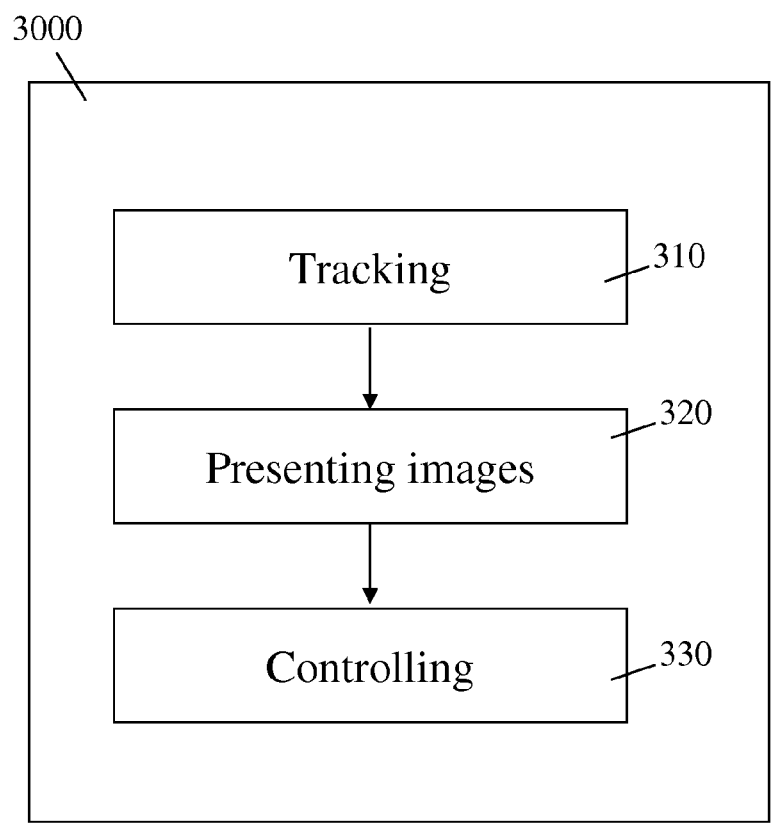
FIG. 3 is a block diagram schematically illustrating a computer readable medium storing computer executable instructions for performing steps of remote hand control of a computer device, according to an exemplary embodiment of the present invention.

Reference is now made to FIG. 3, which is a block diagram schematically illustrating a computer readable medium storing computer executable instructions for performing steps of remote hand control of a computer device, according to an exemplary embodiment of the present invention.

According to an exemplary embodiment of the present invention, there is provided a computer readable medium 3000, such as a CD-ROM, a USB-Memory, a Portable Hard Disk, a diskette, etc.

The computer readable medium 3000 stores computer executable instructions, for performing steps of remote hand control of a computer device, according to an exemplary embodiment of the present invention.

The computer executable instructions include a step of tracking 310 movement of a hand of a user of the computer device, say using images of the hand projected with light structured in a pattern useful for tracking fine movement of fingers and thumbs, as described in further detail hereinbelow.

The computer executable instructions further include a step of presenting 320 a first image representative of the hand and a second image, to the user, say on screen of the computer device, as described in further detail hereinabove.

In the step 320, the first image is further moved in concert with the user hand movement tracked 310, as described in further detail hereinbelow.

Optionally, the second image is a graphical user interface (GUI) of a computer application such as a Microsoft™ Excel spreadsheet with buttons and menu options, a web page with hyperlinks, buttons, etc.

Optionally, the second image is rather representative of a computer input device, say a keyboard or a computer mouse, as described in further detail hereinbelow.

Optionally, the second image is another graphical object, a picture, etc. The first image may be a full and accurately animated image of the user's hand, presented on a screen. Alternatively, the first image rather consists of five cursors, which represent the locations of the hand's fingertips. The first image may also have any other visual appearance which gives the user information about the location of digits (i.e. fingers, thumb, or both) in relation to the second image.

The computer executable instructions further include a step in which the computer device is controlled 330, in accordance with an interaction between the first image and the second image.

Consequently, the user is allowed to control the computer device, by moving the hand for bringing the first image and the second image into the interaction, as described in further detail hereinbelow.

In one example, if the user moves his hand, the first image is moved over an image of a computer keyboard.

If the user moves his fingers in a typing movement, the computer device is controlled 330, to make the computer device respond as if the user types using a real keyboard, as described in further detail hereinbelow.

In a second example, if the user moves his hand, the first image is moved over an image of a computer mouse.

If the user moves his fingers in a clicking movement, the fingers of the first image move in a clicking movement accurately correlated with the movement of the hand's movement. Consequently, the computer device responds as if the user clicks on one of the buttons of a real computer mouse, according to position of the first image in relation to the image of the computer mouse (i.e. with the fingers of the first image positioned over a button of the mouse in the second image).

In a third example, the second image is a graphical user interface (GUI) of a computer application such as a Microsoft™ Excel spreadsheet with buttons and menu options, a web page with hyperlinks, buttons, etc.

The computer device is controlled according to interaction between the images, as if the first image is the user's own hand, and the second image is a GUI presented on a touch screen which allows the user to interact with the GUI's menu, buttons, etc., by touching the touch screen with his fingers.

Optionally, the tracking 310 of the movement of the hand is carried out using bi-dimensional video data (say bi-dimensional video images streamed from a camera), as described in further detail hereinabove.

Optionally, the movement is tracked 310, by detecting a segmentation (i.e. division) of a continuous feature in a light pattern projected onto the hand. The light pattern has the continuous feature in a first direction, and a non-continuous feature in a direction substantially perpendicular to the first direction, as described in further detail hereinbelow.

In one example, the light pattern includes several stripes arranged in parallel (or in near parallel) to each other.

Optionally, the instructions further include identifying in the light pattern, one or more clusters of one or more stripe segments created by segmentation of stripes by a digit of the hand (i.e. a finger or a thumb), as described in further detail hereinbelow. Consequently, the movement of the digit may be tracked 310, by tracking the cluster of stripe segments created by segmentation of stripes by the digit, or by tracking at least one of the cluster's segments.

Optionally, the instructions further include identifying a depth movement of the digit, say by detecting a change in the number of segments in the tracked cluster, as described in further detail hereinbelow.

Optionally, the instructions further include identifying in the light pattern, one or more clusters of one of more stripe segments created by segmentation of stripes by a palm of the hand. Consequently, the movement of the hand may be tracked 310, by tracking the cluster of stripe segments created by segmentation (i.e. division) of stripes by the palm, or by tracking at least one of the cluster's segments.

Optionally, the instructions further include detecting a shift in position of a notation along a continuous feature in the light pattern projected onto the hand. The detected shift is used for tracking 310 of the hand, as described in further detail hereinbelow.

Optionally, the instructions further include detecting a gesture predefined by an administrator, in the tracked 310 movement of the hand. Upon the detection of the gesture, the computer device is controlled 330 in a manner predefined for the detected gesture, as described in further detail hereinbelow.

Optionally, the instructions further include a step in which, upon detection of the predefined gesture, the first image is aligned into a predefined position. In one example, if the user shakes his hand, the first image is aligned into a central position over the second image (say the computer keyboard image or GUI).

Optionally, the instructions further include a step in which, upon detection of the predefined gesture, the first image is resized, as described in further detail hereinbelow.

Figure 4:
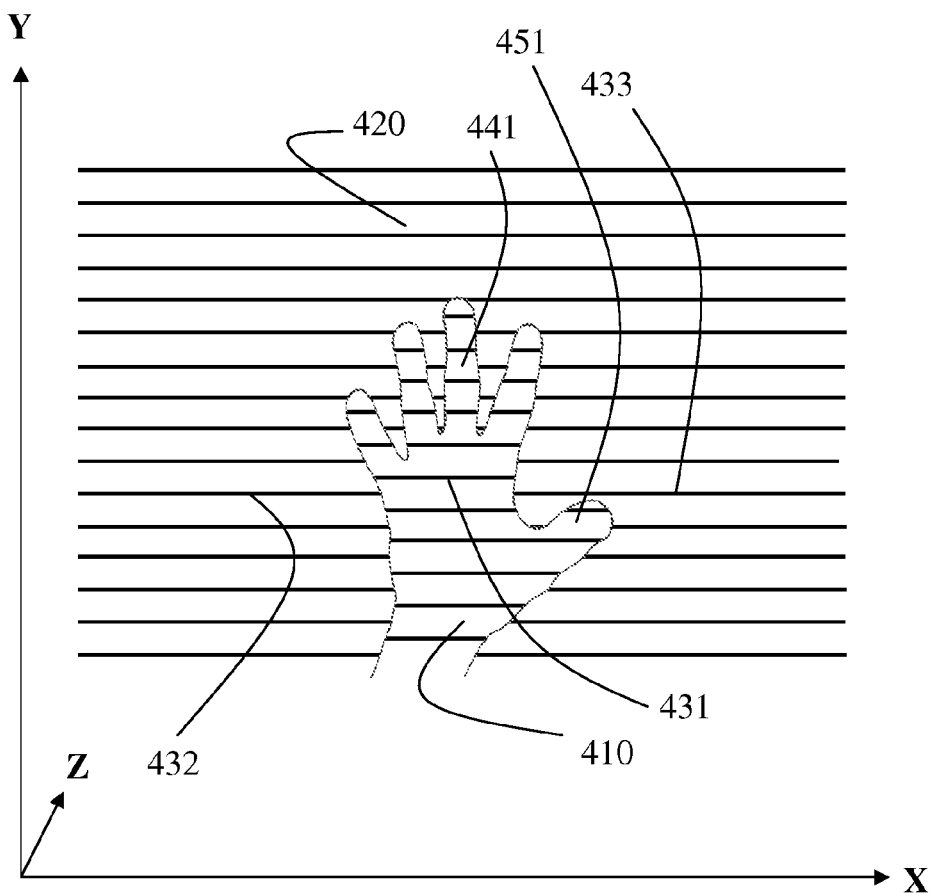
FIG. 4 schematically illustrates a hand projected with a light pattern, according to an exemplary embodiment of the present invention.

Reference is now made to FIG. 4, which schematically illustrates a hand projected with a light pattern, according to an exemplary embodiment of the present invention.

According to an exemplary embodiment, the tracking of the movement of the hand is carried out, using a light pattern designed to enable detection of hand movement, such as fine movements of fingers and thumbs.

The specifically designed light pattern allows the tracking of the movement, even in bi-dimensional video data, which unlike three dimensional depth map, does not provide for easy separation of the hands from the rest of the body, according to distance, as described in further detail hereinabove.

Optionally, the light pattern is specifically designed to track movement of the hand's digits in a bi-dimensional video data (say video images streamed from a regular video camera). More specifically, the light pattern may be designed to enable detection and tracking of digits (i.e. fingers and thumb) as well as palm, in the bidimensional video data, according to distortions of the pattern by the digits, as described in further detail hereinbelow.

Optionally, the light pattern has a continuous feature in a first direction (say the X-axis) and a non-continuous (say periodic) feature in a direction substantially perpendicular to the first direction (say the Y-axis).

In one example for such a pattern, the light pattern includes several stripes arranged in parallel (or in near parallel) to each other, as illustrated schematically using FIG. 4.

A camera is positioned in a certain Y-axis distance, above a light projector which projects the stripes pattern on the hand 410 and on the background 420 (say a surface of a table the hand rests on, a wall, etc.).

The position of the camera is selected, so as to create a triangulation effect between the camera, the light projector and the light reflected back from the user's hand 410 and the background 420, as known in the art.

The triangulation effect causes discontinuities in the pattern at the points along a stripe where there are significant depth shifts from an object projected with a light pattern.

The discontinuities segment (i.e. divide) the stripe into two or more stripe segments, say a segment 431 positioned on the hand, a segment 432 position to the left of the hand and a segment 433 position to the right of the hand.

Such depth shift generated stripe segments may be located on the contours of the user's hand's palm or digits, which are positioned between the camera and the user's body.

That is to say that the user's digit or palm segments the stripe into two or more stripe segments.

Once such a stripe segment is detected, it is easy to follow the stripe segment, to the stripe segment's ends.

The hand tracker 110 may thus analyze bi-dimensional video data (say a video stream forwarded to the hand tracker 110 from the camera), to generate clusters of stripe segments.

For example, the hand tracker 110 may identify in the light pattern, a cluster of one or more stripe segments created by segmentation of stripes by a digit of the hand, say a cluster 441 of four segments reflected from the hand's central finger. Consequently, the hand tracker 110 tracks the movement of the digit, by tracking the cluster of stripe segments created by segmentation of stripes by the digit, or by tracking at least one of the cluster's segments.

The cluster of stripe segments created by segmentation (i.e. division) of stripes by the digit includes strip segments with an overlap in the X axis. Optionally, the stripe segments in the cluster further have similar lengths (derived from the fingers thickness) or relative proximity in the Y-axis coordinates.

On the X-axis, the segments may have a full overlap for a digit positioned straightly, or a partial overlap for a digit positioned diagonally in the X-Y plane.

Optionally, the hand tracker 110 further identifies a depth movement of the digit, say by detecting a change in the number of segments in the tracked cluster.

For example, if the user stretches the user's central digit, the angle between the digit and the plane of the light projector and camera (X-Y plane) changes. Consequently, the number of segments in the cluster 441 is reduced from four to three.

Optionally, the hand tracker 110 further identifies in the light pattern, one or more clusters of one or more stripe segments created by segmentation of stripes by a palm of the hand. Consequently, the movement of the hand is tracked 210, by tracking the cluster of stripe segments created by segmentation of stripes by the palm, or by tracking at least one of the cluster's segments.

The cluster of stripe segments created by segmentation of stripes by the palm includes an upper strip segment 431 which overlaps with the user hand's fingers stripe segment clusters, in the X axis.

The upper strip segment 431 overlaps the four finger clusters in the X-axis, but do not exceed beyond the minimum and maximum X value of the four finger clusters' bottom segments.

The cluster of stripe segments created by segmentation of stripes by the palm further includes, just below segment 431, a few strip segments in significant overlap with the strip segment 431. The cluster of stripe segments created by segmentation of stripes by the palm further includes longer stripe segments that extend to the base of a stripe segment cluster 451 of the user's thumb.

The digit and palm cluster's orientation may differ with specific hands positions and rotation.

Figure 5:
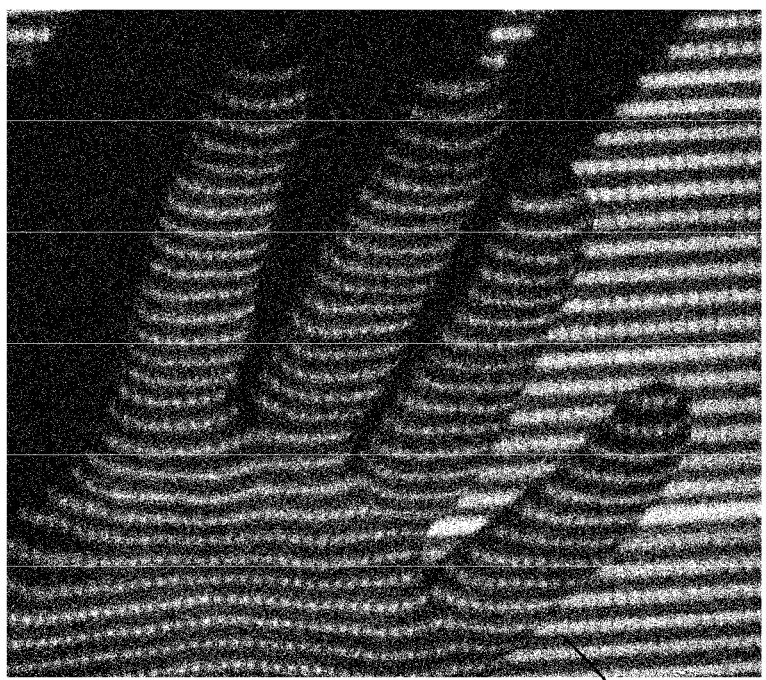
FIG. 5 schematically illustrates a hand projected with a light pattern having an intensity notation, according to an exemplary embodiment of the present invention.

Reference is now made to FIG. 5, which schematically illustrates a hand projected with a light pattern having an intensity notation, according to an exemplary embodiment of the present invention.

One problem with the light pattern illustrated hereinabove is a stripe segment unification problem.

In certain cases, stripe segments reflected from background of the hand may unite with stripe segments reflected from the hand. Consequently, the stripe segment clusters of the palm and digits cannot be found, and the hands cannot be tracked.

One way that may help overcome the stripe segment unification problem, is through introduction of a periodic notation along each stripe, as illustrated in FIG. 5.

Optionally, the notation is in a form of a light intensity 320, which changes along the stripe, or a specific shape that appears in a constant distance along the stripe, such as a short vertical line.

Further to the introduction of the periodic notation, the camera is positioned with respect to the light projector, with a gap in the X-axis, as well as the gap in the Y-axis discussed in further detail hereinabove. This gap in the X-axis creates a phase shift in the position of the notations along the stripes with respect to the object's distance.

Consequently, in cases in which the stripe segments reflected from the hands unite with strip segments reflected from the background, the segments still have different phases of the periodic notation. Optionally, the ratio of the vertical and horizontal distances between the camera and the light projector is carefully selected, so as to maximize the notation's phase shift between the segments when the segments unite.

A second way which may prove useful for overcoming the problem of the united segments is by changing the setup of the camera and light projector, so as to differ in their Z-axis positions too.

A difference in Z-axis positioning between the camera and the light projector may be brought about either by physically positioning the camera and light projector in different Z-axis positions or by deployment of a negative or positive lens in front of the projected pattern at a certain distance.

Consequently, the stripe segments of the light pattern reflected from the object have different periods at different object distances. Therefore, even if one of the stripe segments reflected from the hand unites with a stripe segment reflected from the background, adjacent lines do not unite because of the different periods.

A third way which may prove useful for overcoming the problem of the united segments, is carried out using a micro structured element, which converts the light beam into a light beam of a varying cross sectional intensity profile, as described in further detail hereinabove.

The cross sectional intensity profile changes according to distance of an object which reflects the light pattern, from the light projector.

Consequently, the cross sectional intensity profile of the stripe segments reflected from the hand and the cross sectional intensity profile of the stripe segments reflected from the background, are different, as described in further detail hereinabove.

A method according to an exemplary embodiment of the present invention may further include tracking of depth movement of the hand's digit, by detecting a vertical movement of the cluster of stripe segments created by segmentation of stripes by the digit, a horizontal movement of notations on the stripe segments, or both.

Optionally, the tracking of the depth movement of the digit is carried out by detecting a vertical movement of the uppermost segment in the cluster of stripe segments created by segmentation of stripes by the digit. The uppermost segment represents the tip of the digit, which performs the digit's most significant movement in the Z-Y plane.

Optionally, the tracking of the depth movement is carried out by detecting a change in number of segments in the tracked cluster. That is to that a depth movement of the hand finger (i.e. movement in the Z-axis) may cause one of the tracked stripe segments of the digit to move upwards and disappear, cause a new stripe segment to appear, etc.

Figure 6:
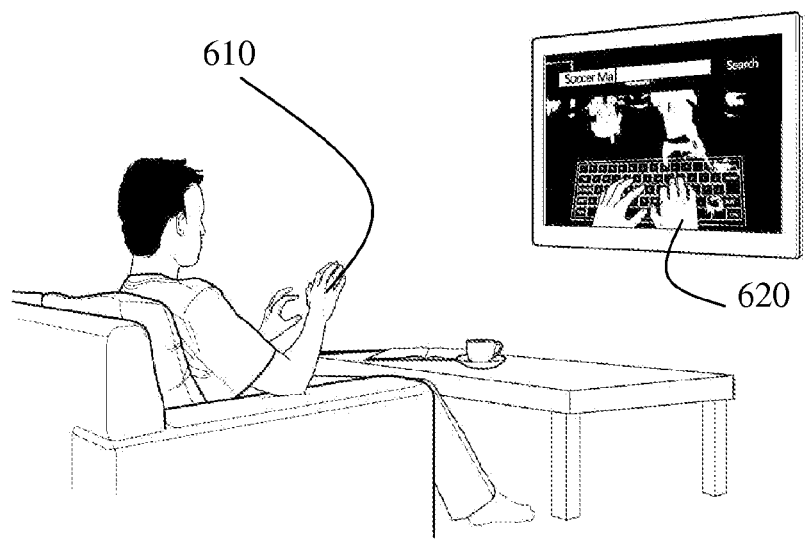
FIG. 6 is a block diagram schematically illustrating remote hand control of a computer device, using an image of a computer keyboard, according to an exemplary embodiment of the present invention.

Reference is now made to FIG. 6, which is a block diagram schematically illustrating remote hand control of a computer device, using an image of a computer keyboard, according to an exemplary embodiment of the present invention.

According to an exemplary embodiment of the present invention, movement of a hand 610 of a user of a computer device (say a desktop computer) is continuously tracked.

The user is presented a first image 620 representative of the hand and a second image representative of a computer input device, say a computer keyboard, a computer mouse, a joystick, etc., as known in the art, on a screen.

The first image 620 may be a full and accurately animated image of the user's hand, presented on a screen. Alternatively, the first image 620 may consist of five cursors, which represent the locations of the hand's 610 fingertips. The first image 620 may also have any other visual appearance which gives the user information about the location of digits (i.e. fingers and thumb) in relation to a computer input device also displayed on the screen.

As the user moves his hand 610 (or only his fingers or thumb), the first image 620 is moved in concert with the tracked movement. That is to say that the movement of the first image 620 is correlated with the movement of the user's own hand 610. If the user moves his hand 610 to the left, the first image 620 moves to the left. If the user flexes one of his fingers, the first image 620 also flexes the finger, etc.

The computer device is controlled according to interaction between the first image 620 and the second image, as if the hand in the image 620 is the user's own hand 610, and the input device is a real computer input device connected to the computer device. The computer input device may include, but is not limited to a standard peripheral computer device, such as a keyboard, a joystick, a computer mouse, etc.

The user is thus allowed to remotely control the computer device, by moving the user's hand 610, for bringing the first image 620 and the second image into the interaction.

Consequently, the remote control of the computer device, by movement of the user's hand 610, is based on a continuous user interface, rather than on an interface limited to a predefined set of specific gestures (though specific gestures may also be defined).

In one example, if the user moves his hand 610, the first image 620 moves over an image of a computer keyboard, and if the user moves his fingers in a typing movement, the computer device responds as if the user types using a real keyboard, as described in further detail hereinbelow.

In one example the second finger of the first image 620 is just above the 'C' character on an image of a computer keyboard. When the user makes a pressing movement with his hand's 610 second finger, the second finger of the first image 620 moves in parallel and presses the 'C' character of the keyboard image presented on the screen. Consequently, the computer device responds as if the 'C' character of a real keyboard wired to the computer device is pressed by the user, using the user's own finger.

In the example, the absolute location of the user hands in a three dimensional space is not relevant, and only the movement of the user's fingers needs to be tracked.

The movement of the first image 620 though accurately correlated with the movement of the user's own hand 610, may be carried out in a different scale. That is to say that the size of the first image 620 may differ from the size of the user's real hand 610.

Optionally, the gesture recognizer of apparatus 1000 further allows the user the resize the first image 620, as described in further detail hereinbelow.

Figure 7:
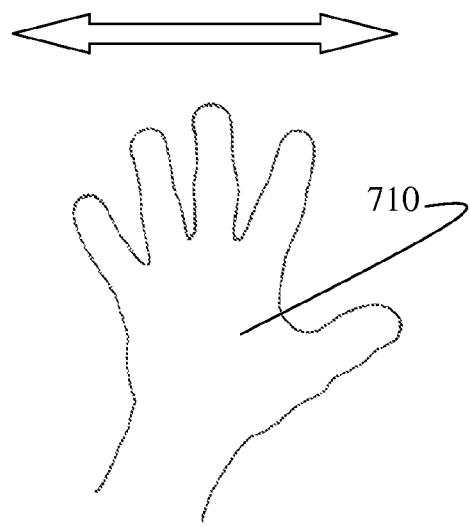
FIG. 7 is a block diagram schematically illustrating a first gesture for remote hand control of a computer device, according to an exemplary embodiment of the present invention.

Reference is now made to FIG. 7, which is a block diagram schematically illustrating a first gesture for remote hand control of a computer device, according to an exemplary embodiment of the present invention.

An apparatus according to an exemplary embodiment of the present invention may include a gesture recognizer, as described in further detail hereinabove.

A first exemplary gesture, according to an exemplary embodiment of the present invention, is a reset gesture in which the user shakes his hand 710 in front of the camera (say by quick minor vibration of the fingers and hand in a lateral movement).

Upon detection of the reset gesture, the first image presented on the screen, moves to a predefined position over the second image, say to a predefined position over a computer input device presented in the second image or to a position over a first line of a spreadsheet like graphical user interface presented on the screen.

In one example, upon detection of the exemplary reset gesture, the image presenter 120 moves the first image into a position over a displayed computer keyboard's center, as described in further detail hereinabove.

The exemplary reset gesture may further ease detection of a digit location, since the exemplary reset gesture comprises separate movement of each digit.

Figure 8:
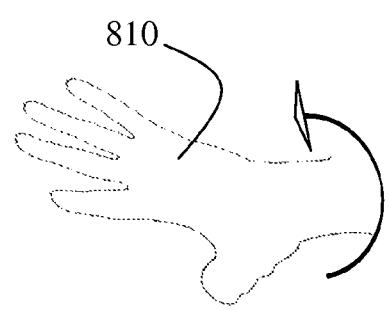
FIG. 8 is a block diagram schematically illustrating a second gesture for remote hand control of a computer device, according to an exemplary embodiment of the present invention.

Reference is now made to FIG. 8, which is a block diagram schematically illustrating a second gesture for remote hand control of a computer device, according to an exemplary embodiment of the present invention.

A second exemplary gesture is a resize gesture, say a gesture in which the user turns is hand 810 in a predefined direction.

Optionally, upon detection of the exemplary resize gesture, the image presenter 120 changes the size of the first image displayed on the screen, without changing the second image in terms of size or zoom level.

For example, a user who interacts with an image of a keyboard displayed in a full screen mode, may want to use a larger first image (say hand image), in order to get from one side of the keyboard to the other with a relatively small movement of his real hands (since the scale of movement depends on size of the hand image). However, the user may need a smaller first image (say hand image), for selecting a text with a small font on his web browser.

Alternatively, the size of the first image (i.e. hand image) remains constant, and the image presenter 120 rather resizes the second image (say the keyboard), which shrinks, expands, zooms in or zooms out, thus changing the size proportion between the first image and the second image.

Figure 9:
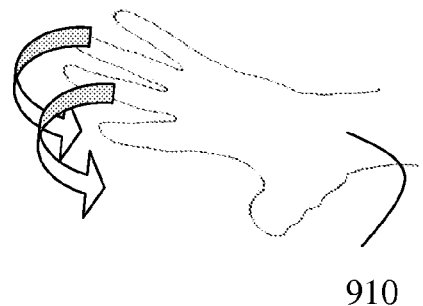
FIG. 9 is a block diagram schematically illustrating a third gesture for remote hand control of a computer device, according to an exemplary embodiment of the present invention.

Reference is now made to FIG. 9, which is a block diagram schematically illustrating a third gesture for remote hand control of a computer device, according to an exemplary embodiment of the present invention.

A third exemplary gesture is a click (or a double click) gesture, say a gesture in which the user clicks 910 using one or two fingers of the user's hand.

Optionally, upon detection of the exemplary click (or a double click) gesture, the image presenter 120 moves fingers of the first image in a clicking movement accurately coordinated with the movement of the user's fingers.

For example, the user may be presented an image of a computer mouse, and be allowed to move the first image into a position above the computer mouse in the image.

When the user moves his own fingers in a clicking movement, the fingers of the first image click on the image of the computer mouse, and the computer controller 130, makes the computer device respond as if the user clicks on a real computer mouse with the user's own fingers.

Figure 10:
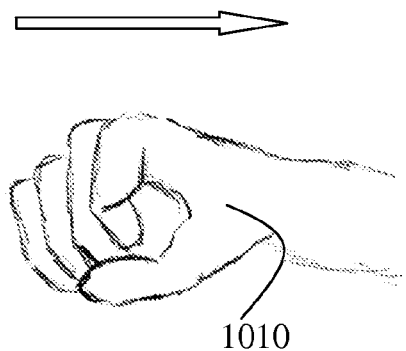
FIG. 10 is a block diagram schematically illustrating a fourth gesture for remote hand control of a computer device, according to an exemplary embodiment of the present invention.

Reference is now made to FIG. 10, which is a block diagram schematically illustrating a fourth gesture for remote hand control of a computer device, according to an exemplary embodiment of the present invention.

A fourth exemplary gesture is a zooming gesture, such as a gesture in which the user zooms in or simply magnifies an image presented on screen of a computer device, say by moving the user's hand 1010 in a pulling movement or by moving two of the user's fingers away from each other (similarly to movement of fingers away from each other on a touch screen of a smart phone).

In one example, upon detection of the movement of the fingers away from each other, the image presenter 120 moves two fingers of the first image away from each other in parallel to the movement of the user's fingers. The computer controller 130 controls the computer device (say a cellular smart phone), for zooming in or magnifying the image presented on screen of the computer device, thus providing the user with a touch screen like functionality without having the user touch a real touch screen.

Exemplary embodiment of the present invention provide for a variety of other user gestures, say a scrolling down gesture in which the user straitens his finger, or a scrolling up gesture in which the user moves his finger in the opposite direction. The gestured may be carried with one or two hands, one or more digits, hand and digits, etc.

However, with exemplary embodiment of the present invention, the remote control of the computer device, by movement of the user's hand, is based on a continuous user interface, rather than on an interface limited to a predefined set of specific gestures (though specific gestures may also be defined).

For example, the remote control of the computer device may be based on a continuous interaction of the user with the image of the computer keyboard presented on screen of the computer device. The user is allowed to move his hand in the air, thus moving the first image over the keyboard, to move the user's digits in a typing movement, thus typing on the keyboard with the fingers of the first image, etc., as described in further detail hereinabove.

In another example, the moves his hand, for moving the first image through an interaction, in which the first image holds a computer mouse presented on screen, drags the mouse, etc. The computer device moves a cursor on screen, as if a real mouse is dragged by the user, using is own hand.

Optionally, in the example, the user is further allowed to cause the mouse to move automatically, by a single small middle finger movement. Consequently, the mouse moves automatically from one side of the screen to the other, or rather the mouse moves through a predefined distance or time (say for three seconds).

In yet another example, a graphical user interface (GUI) of a computer application such as a Microsoft™ Excel spreadsheet with buttons and menu options, a web page with hyperlinks, buttons, etc., is presented to the user on screen of the computer device.

The computer device is controlled according to a continuous interaction between a hand image moving in concert with movement of a user's own hand and fingers, and the GUI's menu, buttons, etc., as if the user touches a touch screen which presents the GUI to the user, with the user's own fingers.

Figure 11:
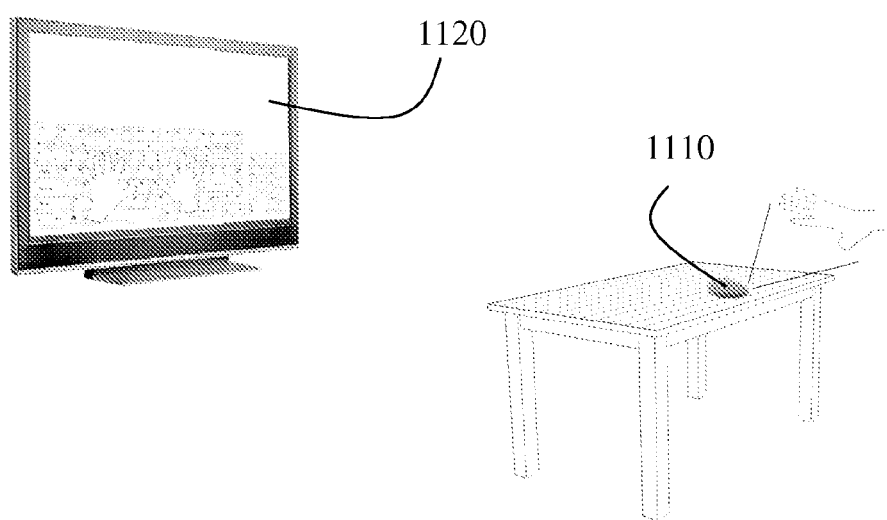
FIG. 11 is a block diagram schematically illustrating a system for remote hand control of a computer device, according to an exemplary embodiment of the present invention.

Reference is now made to FIG. 11, which is a block diagram schematically illustrating a system for remote hand control of a computer device, according to an exemplary embodiment of the present invention.

An exemplary system for remote hand control of a computer device includes the parts of apparatus 1000, as described in further detail hereinabove.

Optionally, one or more of the parts of the apparatus 1000, say the camera and the light projector are installed on a mobile unit 1110. The mobile unit 1110 wirelessly communicates with other parts of the apparatus 1000, with the computer device 1120 (say a computer combined with a screen, like an Apple™ iMac computer, a TV set with a computer processor, etc.), or both.

The user may place the mobile unit 1110 on a table.

Then, the user may sit on a chair next to the table, move his hands, and thereby control the computer device 1120. The user controls the computer device 1120, through an interaction of the first image (representative of the user's hand) with an image of a computer keyboard presented on a screen of the computer device 1120, as described in further detail hereinabove.

The exemplary method and apparatus of the present invention may be used for additional applications.

For example, on a cellular phone, apparatus 1000 may enable the user to scroll, type text, zoom and click, without touching the cellular phone. Consequently, the cellular phone may be small, but may still allow interaction with the cellular phone, as if the phone has a full size computer keyboard.

Optionally, the cellular phone has a projector, which may project images on a wall. Using the apparatus 1000, the user may move a first image projected next to an image of the phone's controller, be the controller a regular phone button or a touch screen.

Consequently, the user may bring the first image (say hand image) into interaction with the image of the phone's controller, thus operating the phone in accordance with the interaction, as if the user uses his own hand to operate the real phone controller directly.

In another example, the computer device is a computer device installed in a car (say a GPS unit or a phone unit).

Operating the computer device while driving is dangerous by nature of interfaces typically provided by such devices (i.e. small buttons or touch screen), as a driver has to look to the side, for operating the computer device, rather than to the road, through the front window of the car.

The apparatus 1000 of the present embodiments may be installed on the car's computer device (or in communication with the car's computer device).

The hand tracker 110 may track hand and finger movement of the driver, and thereby enable the driver to control the computer device (say the GPS or phone unit), without moving the driver's eyes from the road, to his fingers which operate the small buttons of the unit.

Optionally, an image of a hand and an image of the GPS or phone unit's keys are presented to the driver on a small screen installed on the cars front window, without significantly blocking sight through the window.

The actual and exact location of the driver's own hand may change.

That is to say that the driver may click wherever he finds convenience, to actually dial the numbers or choose his destination in a guiding system of the GPS unit.

Consequently, the driver may control the GPS or phone unit, using his hand on an arbitrary area of the drive wheel, while looking through the front window on which the screen is installed, and keeping his eyes on the road.

Further, the driver may shake his hands in a reset movement, as described in further detail hereinabove. Consequently, the first image is positioned on center of an image of the car phone's numbers or the car's GPS unit touch screen buttons, present on the screen.

The apparatus 1000 may also be installed on a musical instrument, say a synthesizer, a DJ turn table, or another musical instrument guided by hand movements of the user, as described in further detail hereinabove.

It is expected that during the life of this patent many relevant devices and systems will be developed and the scope of the terms herein, particularly of the terms "Computer", "CD-ROM", "USB-Memory", "Hard Disk", "Camera", "Diffractive Optical Element", "Laser Diode" and "LED", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described m conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

Further General Discussion

Some methods include regular image analysis from a digital video stream.

The video images are therefore analyzed to detect a specific area of interest, usually a body part such as a hand, a face, an arm, etc.

After detecting the body part location and position, body gestures may be detected and translated to control media displayed on a computer screen or TV. Detecting a body part such as the user's hand and fingers requires first to analyze each pixel in the image by its color values and to compare it to other pixels in its environment. Such a method may suffer from high computational time and from relatively high percentage of errors and false readings. One of the main difficulties comes from the background behind the hands needed to be detected. For example, the method may have difficulties detecting the hands of a user that wears a shirt with a color that is close to his skin color or with another complex pattern. The lightning of the room affects also the detection performance. The angle of the hands towards the camera may be a difficulty in this method as well. The shape of the hand changes with the rotation of it and the fingertips may be on the same axis with the rest of the hand towards the camera, and therefore be not detectable by color difference.

Other methods for hand detection and gesture recognition include using a 3D depth map. The depth map is an image that holds in each pixel the distance to the part of the object located in front of the depth camera, which is represented by the pixel. A depth solves many of the problems that exist in regular 2D video analysis. Extracting the hands location is relatively easy since they are usually located in front of the body and therefore can be separated by cutting out the parts of the image that exceed a certain distance. With such methods, the angle of the hands towards the camera is less significant in the same manner. The closest part of the hand or the body can be detected by just the distance, without considering the background color. However, acquiring a full 3D depth map requires a relatively complex hardware and computational effort.

The full depth map of a human body may be significant for certain applications of gesture recognition such as gaming. For example, in a tennis game application it is important exactly how the user is located, if his hand is stretched back ready to hit the ball or stretched forward to block the ball near the net. However, other applications such as a gesture driven virtual keyboard or mouse may not have the need for full 3D depth mapping of hands and fingers, in order to control the applications.

Therefore, extraction of the gestures directly from a light pattern image without acquiring a full 3D depth map as an intermediate step, as taught in further detail hereinabove, may prove advantageous.

Image comparison based solutions may use structured light patterns such as a grid pattern in order to directly detect gestures. The comparison based solutions detect distortion in the grid pattern and compare the distortions to a pre defined set of distortions of the grid pattern that represent specific gestures. Once detected, the gestures activate computer actions which are attached to each gesture. Although the image comparison based solutions extract hand gestures directly for a captured light pattern image, they are limited to a discrete set of predefined gestures, and do not offer a flexible tracking and representation of the user hands and fingers, and the controlling of a computer device through a continuous user interface, as described in further detail hereinabove.

The invention claimed is:

1. A computer implemented method comprising:
obtaining a time series of images of a hand of a user of a computer device, the hand projected with a light structured in a pattern that enables tracking the hand, the pattern of the structured light comprises a continuous feature in a first direction and a non-continuous feature in a second direction;
detecting segmentation of the continuous feature based on changes in intensity profiles of light reflected from the hand along the first direction;
tracking a movement of the hand using the images by identifying, in the pattern of the structured light, at least one cluster of continuous feature segments created by the segmentation of the continuous feature by at least one part of the hand and tracking the at least one cluster of continuous feature segments;
presenting, on a display of the computer device, a first image representative of the hand and a second image representative of an object of a computer application running on the computer device;
moving the first image in concert with the tracked movement of the hand;
detecting an interaction between the first image and the second image, the interaction represented by the first image with respect to the second image on the display of the computer device; and
invoking a functionality of the computer application based on the detected interaction.

2. The method of claim 1, wherein the continuous feature in the first direction comprises a plurality of stripes arranged substantially in parallel to each other, and the second direction is perpendicular to the first direction.

3. The method of claim 1, wherein the tracking of the movement of the hand comprises using bi-dimensional video data.

4. The method of claim 1, wherein the pattern of the structured light enables tracking movement of digits and a palm of the hand in bi-dimensional video data based on distortions of the pattern by the digits and the palm.

5. The method of claim 1, wherein the tracking of the movement of the hand further comprises identifying a depth movement of the at least one part of the hand, by detecting a change in a number of the continuous feature segments in the at least one tracked cluster.

6. The method of claim 1, wherein the pattern of the structured light comprises a grid pattern, and the method further comprises:
detecting a predefined gesture in the movement of the hand by projecting the structured light having the grid pattern onto the hand.

7. An apparatus, comprising:
a light projector configured to project, onto a hand of a user of a computer device, a light structured in a pattern that enables tracking of the hand, the pattern of the structured light comprises a continuous feature in a first direction and a non-continuous feature in a second direction;
a camera configured to capture a time series of images of the hand by capturing images of the hand projected with the pattern of the structured light;
a hand tracker, associated with the camera, configured to detect segmentation of the continuous feature based on changes in intensity profiles of light reflected from the hand along the first direction,
the hand tracker is further configured to track a movement of the hand using the images by identifying, in the pattern of the structured light, at least one cluster of continuous feature segments created by the segmentation of the continuous feature by at least one part of the hand and tracking the at least one cluster of continuous feature segments;
an image presenter, associated with the hand tracker, configured to present, on a display of the computer device, a first image representative of the hand and a second image representative of an object of a computer application running on the computer device; and
a computer controller, associated with the image presenter, configured to move the first image in concert with the tracked movement of the hand, wherein the computer controller is further configured to
detect an interaction between the first image and the second image, the interaction represented by the first image with respect to the second image on the display of the computer device, and
invoke a functionality of the computer application based on the detected interaction.

8. The apparatus of claim 7, wherein the continuous feature in the first direction comprises a plurality of stripes arranged substantially in parallel to each other, and the second direction is perpendicular to the first direction.

9. The apparatus of claim 7, wherein the hand tracker is further configured to use bi-dimensional video data for tracking the movement of the hand.

10. The apparatus of claim 7, wherein the pattern of the structured light enables tracking movement of digits of the hand in bi-dimensional video data.

11. The apparatus of claim 7, wherein the pattern of the structured light enables tracking movement of digits and a palm of the hand in bi-dimensional video data based on distortions of the pattern by the digits and the palm.

12. The apparatus of claim 7, wherein the hand tracker is further configured to identify a depth movement of the at least one part of the hand, by detecting a change in a number of the continuous feature segments in the at least one tracked cluster.

13. The apparatus of claim 7, wherein the camera is further configured to capture the first image by capturing an image of the hand projected with the pattern of the structured light.

14. The apparatus of claim 7, wherein the light projector is remote from the computer device.

15. The apparatus of claim 7, wherein the camera is remote from the computer device.

16. The apparatus of claim 7, further comprising a gesture recognizer, associated with the hand tracker, configured to detect a predefined gesture in the tracked movement of the hand by projecting the structured light having a grid pattern onto the hand, wherein the computer controller is further configured to control the computer device in a manner predefined for the detected gesture.

17. The apparatus of claim 16, wherein the image presenter is further configured to carry out one member of the group consisting of: aligning of the first image into a predefined position, upon the detection of the predefined gesture, resizing the first image, upon the detection of the predefined gesture, and resizing the second image, upon the detection of the predefined gesture.

18. The apparatus of claim 7, wherein the computer controller is a part of one member of the group consisting of a mobile phone, a device installed in a car and a musical instrument.

19. The apparatus of claim 7, wherein the hand tracker is remote from the computer device.

20. A non-transitory computer readable medium storing computer executable instructions for performing steps, the steps comprising:
- obtaining a time series of images of a hand of a user of a computer device, the hand projected with a light structured in a pattern that enables tracking the hand, the pattern of the structured light comprises a continuous feature in a first direction and a non-continuous feature in a second direction;
- detecting segmentation of the continuous feature based on changes in intensity profiles of light reflected from the hand along the first direction;
- tracking a movement of the hand using the images by identifying, in the pattern of the structured light, at least one cluster of continuous feature segments created by the segmentation of the continuous feature by at least one part of the hand and tracking the at least one cluster of continuous feature segments;
- presenting, on a display of the computer device, a first image representative of the hand and a second image representative of an object of a computer application running on the computer device;
- moving the first image in concert with the tracked movement of the hand;
- detecting an interaction between the first image and the second image, the interaction represented by the first image with respect to the second image on the display of the computer device; and
- invoking a functionality of the computer application based on the detected interaction.

* * * * *